United States Patent [19]

Bram

[11] 4,018,461
[45] Apr. 19, 1977

[54] SEALED JOINT HAVING A SOCKET
[75] Inventor: Georges Eugene Bram, Pont-A-Mousson, France
[73] Assignee: Everitube, Neuilly-sur-Seine, France
[22] Filed: Oct. 16, 1975
[21] Appl. No.: 623,114
[30] Foreign Application Priority Data
  Oct. 22, 1974  France .............................. 74.35441
[52] U.S. Cl. .............................. 285/110; 285/231; 285/345; 285/369; 285/383; 285/423; 277/DIG. 2
[51] Int. Cl.² .............................. F16L 17/02
[58] Field of Search .......... 285/110, 111, 230, 231, 285/112, 359, 345, 401, 383, 423, 369; 277/235 R, DIG. 2

[56] References Cited
UNITED STATES PATENTS

| | | | |
|---|---|---|---|
| 3,163,432 | 12/1964 | DeBoer | 285/110 X |
| 3,386,830 | 2/1968 | French | 285/110 |
| 3,857,589 | 12/1974 | Oostenbrink | 285/423 |
| 3,866,925 | 1/1973 | Maimstrom | 285/230 X |

FOREIGN PATENTS OR APPLICATIONS

| | | | |
|---|---|---|---|
| 2,071,336 | 8/1971 | France | 285/110 |
| 2,165,496 | 9/1973 | France | 285/110 |
| 546,099 | 3/1962 | Germany | 285/112 |
| 911,389 | 11/1962 | United Kingdom | 285/111 |
| 1,104,047 | 2/1968 | United Kingdom | 285/110 |

*Primary Examiner* — Dave W. Arola
*Attorney, Agent, or Firm* — Synnestvedt & Lechner

[57] ABSTRACT

A male end is inserted in a socket with radial clearance. An annular elastically yieldable sealing element has an outer heel portion disposed in an inner groove in the socket. A single lip portion on the sealing element extends inwardly of the socket and has a radially inner end which grips the male end. The heel portion has, at rest, an axial dimension which is of the same order of magnitude as its radial dimension and exceeds the axial dimension of the groove. The axial dimension of the groove is greater than the greatest radial space between the male end and the edge of the groove adjacent the entrance of the socket.

7 Claims, 3 Drawing Figures

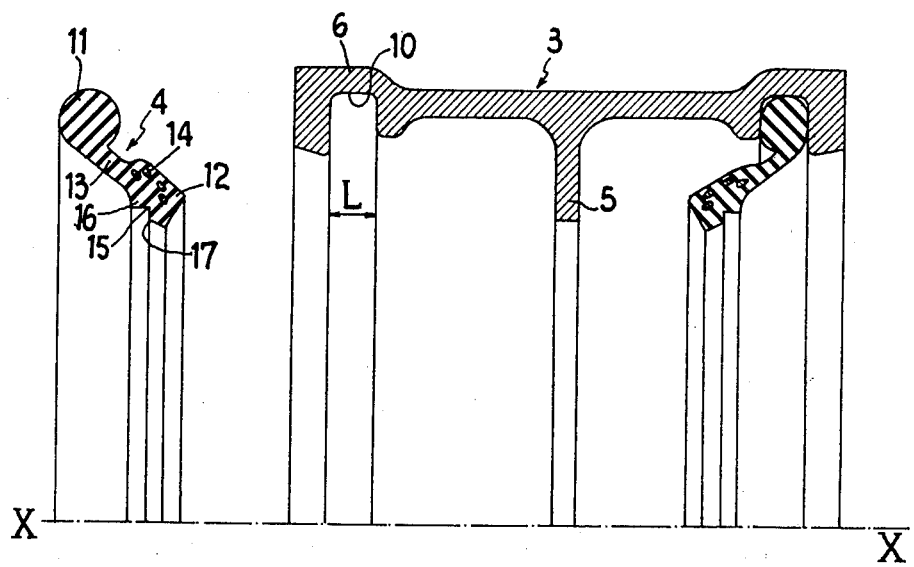
FIG_1
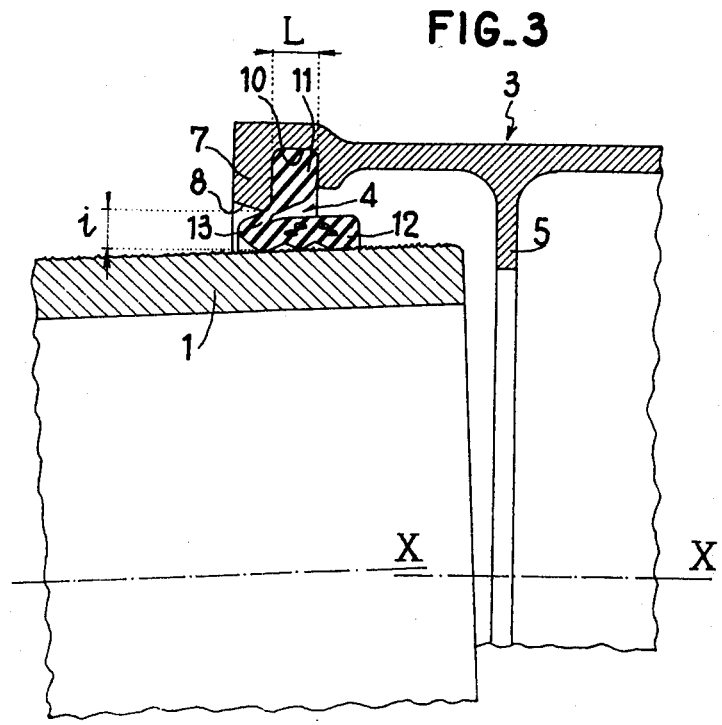
FIG_3

SEALED JOINT HAVING A SOCKET

The present invention relates to a sealed joint of the type comprising a male end introduced with a radial clearance in a socket and an annular elastically yieldable sealing element comprising an outer heel portion which is disposed in a groove of the socket and a lip portion extending toward the inner end of the socket, the end of the lip portion gripping the male end.

The use of such a joint is in particular advantageous when the two adjacent elements to be interconnected of the piping under question may have an angular deviation and the male end has an uneven outer surface.

This type of joint is also adaptable very well in the case where the male ends of the various elements do not have exactly the same circumferential dimension or have an ovalization which may vary.

However, known joints of this type do not ensure a reliable seal at high pressures since the sealing element has a tendency to be expelled from the socket, the heel portion escaping from the groove. Moreover, the introduction of the male end in the socket through the lip portion of the sealing element when assembling the joint is liable to shift this sealing element and cause the heel portion to disengage from the groove.

An object of the invention is to provide a joint of the aforementioned type in which this drawback is avoided without use of an additional member to hold the heel portion in position in the groove.

According to the invention there is provided a joint of the aforementioned type wherein the sealing element comprises a single lip portion and the heel portion of the sealing element has, at rest, an axial dimension which is of the same order of magnitude as its radial dimension and exceeds the axial dimension of said groove, the axial dimension of the groove being greater than the greatest radial space which may exist between the male end and the edge of the groove adjacent the entrance of the socket.

In an advantageous embodiment of the invention, the socket is located at one end of a coupling sleeve which has at its other end an identical socket and in the middle thereof an inner radial flange adapted to act as an abutment for the end faces of the two male ends introduced in the socket.

Further features and advantages of the invention will be apparent from the ensuing description with reference to the accompanying drawings given solely by way of example, and in which:

FIG. 1 is a longitudinal axial half-sectional view of a sealing element and a sleeve adapted to form two joints according to the invention;

FIG. 3 is a longitudinal axial half-sectional view of the detail of such a joint in the case of a great force tending to expel the sealing element.

Figure 2:
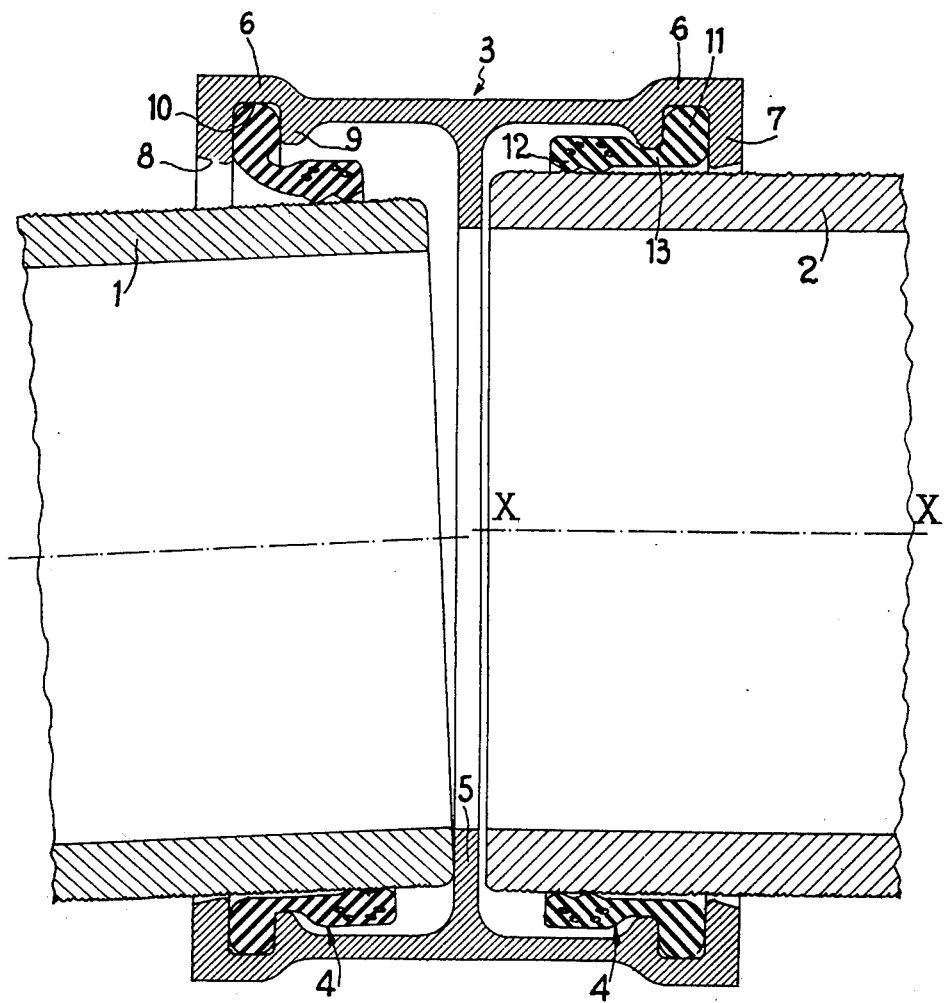
FIG. 2 is an axial sectional view of the double joint produced.

One embodiment of the invention is illustrated in the drawing as applied to the joint betweenn two male ends 1 and 2 pertaining to two pipe elements having a common axis X—X. In practice, as shown in FIG. 2, at least one of these two elements, namely that on the left side of the Figure, may have a certain angular deviation with respect to the axis X—X and be more eccentric (located nearer the lower part of the sleeve 3 of FIG. 2). It will furthermore be assumed hereinafter that the male end 1 which is deviated has the minimum diameter allowed by the manufacturing tolerances. On the other hand, the other male end 2 is assumed to have the maximum diameter within said tolerances and is perfectly centered on the axis X—X.

The device for interconnecting the two male ends comprises the sleeve 3 and two identical annular elastically yieldable sealing elements 4.

The sleeve 3 has a generally cylindrical shape and an axis X—X and its symmetrical with respect to its median plane which is embodied by an inner radial flange 5. The latter limits the penetration and permits the longitudinal positioning of the male ends 1 and 2 in the sleeve. Moreover, it prevents the end faces of the two pipes from coming in contact with each other and damaging each other. This flange is advantageous from this point of view if, for example, in order to interconnect two pipes of asbestos and cement there is employed a sleeve moulded in one piece from polyvinyl chloride which is much less hard.

The sleeve 3 terminates at each end in a socket 6 which is defined externally by an inner radial flange 7. The radially inner face 8 of this flange is frustoconical and slightly outwardly divergent in order to facilitate the introduction of the corresponding male end. The minimum diameter of the face 8 is calculated to allow the passage of a male end of maximum diameter with a slight clearance as can be seen on the right side of FIG. 2. It will be understood that the conicity of the face 8 also permits the coupling or joining of pipes of maximum diameter which are angularly deviated.

In the region of the inner end of the socket 6, there is another flange 9 which extends radially inwardly. Its inside diameter is slightly larger than that of the flange 7. The flanges 7 and 9 have annular planar faces which define therebetween an annular groove 10 whose axial dimension or width L is of the same order of magnitude as its radial depth and exceeds the maximum radial space $i$ which may exist between the face 8 of the flange 7 and the outer surface of the male end, that is to say, when the latter is of minimum diameter and is offset to the maximum extent with respect to the axis X—X (the case of the male end 1 shown in FIG. 2).

There is received in each socket 6 a sealing element 4 which comprises a heel portion 11, and a lip portion having and end portion or beading 12, and an intermediate portion 13 which is frustoconical at rest and convergent in the direction of the inner end of the socket and interconnects the heel portion and the beading.

The heel portion 11 has a solid section which is roughly circular and an outside diameter roughly equal to the diameter of the radially inner end of the groove 10. Its axial dimension or width which is, in the case under question, the diameter of its section, is greater at rest than the axial dimension L of the groove 10. Thus the heel portion 11 may be forced into the groove 10 and stay there, it being firmly maintained therein by axial compression. It will be understood that other sectional shapes of the heel portion 11 could be envisaged provided that they are solid and have an axial dimension which is of the same order of magnitude as their radial dimension and exceeds the axial dimension of the groove 10.

In the beading 12 of the sealing element 4 there is incorporated, when moulding the sealing element, a collar in the form of a spring 14 for elastically gripping the male end. This spring 14 is a coil spring whose end coils have been interconnected so as to impart thereto the shape of a torus, all the coils of this spring being then laid against each other.

The radially inner face of the beading 12 has, in the known manner, an annular L-shaped groove 15 separating two annular ribs 16 having fine or sharp edges 17 for bearing against the male end. Such a beading ensures an excellent seal even if, as shown, the male end to be coupled has an outer surface which is rough which is in particular the case of asbestos cement pipes.

FIG. 3 shows the operation of a joint such as that described in the case which is the most unfavourable as concerns the sealing, namely that of a male end 1 shown in FIG. 2. In the outer part of this joint (with reference to FIGS. 2 and 3), a maximum radial gap $i$ exists between the outer surface of the male end 1 and the face 8 of the flange 7 so that the internal pressure prevailing in the sleeve 3 exerts a pressure on the intermediate portion 13 and the end portion or beading 12 of the lip portion to urge them outwardly of the socket by making the intermediate portion 13 "roll" about the fixed heel portion 11. This action tends to cause the heel portion 11 to move out of the groove 10 but, owing to the aforementioned dimensions, the heel portion is axially clamped in its recess and, moreover, the pressure applies the heel portion against the radially inner end of the groove with a force which is all the greater as it tends to expel the sealing element by pressure on the intermediate portion 13 and the beading 12. But, even in the case of an abnormal overpressure, the sealing element remains well anchored in the socket and the seal is ensured.

Moreover, the heel portion 11 is not liable to move out of the groove 10 when the male end 1 is introduced in the socket, notwithstanding the fact that this male end is gripped by the beading 12 before reaching the flange 5 of the sleeve 3.

Having now described my invention what I claim as new and desire to secure by Letters Patent is:

1. A sealed pipe joint comprising means defining a socket having an entrance, means defining a male end extending through said entrance into the socket with a radial clearance and capable of angular deviation relative to the socket, two annular planar faces axially defining an inner annular groove in the socket, a first of said annular planar faces adjacent said entrance having an inner peripheral edge defining an annular clearance with the male end, and an annular elastically yieldable sealing element coaxial with the socket and having at one end of the sealing element an annular substantially smooth solid heel portion disposed in the groove of the socket and a single annular lip portion extending from the heel portion axially inwardly of the socket, the lip portion having an annular end portion which is remote from the heel portion and is in gripping relation to the male end and an annular intermediate portion which is flexible and capable of acting as a hinge, the socket radially defining with the end portion of the lip portion an annular space which allows an angular and radial deviation between the male end and the socket and allows fluid pressure in the pipe access to a side of the end portion radially remote from the male end, the heel portion having, when the sealing element is in a free undeformed state, a width axially of the sealing element which is of the same order of magnitude as the thickness of the heel portion radially of the sealing element and exceeds the axial width of the groove so that the heel portion is compressed between said two annular planar faces, the axial width of the groove being greater than the greatest radial clearance which can exist between the male end and said inner peripheral edge of said first one of said annular planar faces.

2. A joint as claimed in claim 1, wherein the heel portion of the sealing element has, when the sealing element is in a free undeformed state, a circular section.

3. A joint as claimed in claim 1, wherein the annular end portion of the lip portion is in the form of a beading comprising an elastically yieldable gripping collar embedded in the beading.

4. A joint claimed in claim 3, wherein the beading has a radially inner face and includes an annular L-shaped groove between two annular ribs having a fine edge for bearing against the male end.

5. A joint as claimed in claim 1, wherein said first annular planar face is defined by a radial annular flange having a radially inner face which is frustoconical and is divergent outwardly of the socket.

6. A joint as claimed in claim 1, wherein the socket is located at one end of a coupling sleeve which sleeve defines at its other end an identical socket and at its middle an inner radial flange for acting as an abutment for end faces of two male ends introduced in the sockets.

7. A joint as claimed in claim 6 for coupling two male ends of asbestos-cement, wherein the sleeve is moulded in one piece from polyvinyl chloride.

* * * * *